United States Patent [19]
Faris et al.

[11] Patent Number: 6,004,484
[45] Date of Patent: Dec. 21, 1999

[54] ACRYLATE POLYMER ABRASION AND STATIC RESISTANT COATING

[75] Inventors: Tom V. Faris, Pataskala; Steven C. Akey, Dublin; David T. Chan, Columbus, all of Ohio

[73] Assignee: Plaskolite Inc., Columbus, Ohio

[21] Appl. No.: 09/149,125

[22] Filed: Sep. 9, 1998

Related U.S. Application Data

[60] Provisional application No. 60/058,373, Sep. 9, 1997.

[51] Int. Cl.$^6$ ...................................................... H01B 1/00
[52] U.S. Cl. ...................... 252/500; 252/501.1; 526/242; 526/244; 526/245
[58] Field of Search .............................. 526/72, 242, 243, 526/244, 245; 252/500, 501.1; 524/177

[56] References Cited

U.S. PATENT DOCUMENTS 5,122,558   6/1992   Knobel et al. ........................... 524/165
5,445,866   8/1995   Martinson et al. ...................... 428/195

*Primary Examiner*—Yogendra Gupta
*Assistant Examiner*—D G Hamlin
*Attorney, Agent, or Firm*—Vorys Sater Seymour & Pease LLP

[57] ABSTRACT

A curable coating composition for preparing an anti-static coating contains at least one addition polymerizable ethylenically unsaturated monomer, a perfluoro ionic surfactant, and a polyethoxy or fluorinated polyethoxy auxiliary compound. The perfluoro ionic surfactant and the polyethoxy or fluorinated polyethoxy auxiliary compound are present in the composition in amounts effective to impart static-dissipative properties to polymerized coatings prepared therefrom.

29 Claims, No Drawings

ACRYLATE POLYMER ABRASION AND STATIC RESISTANT COATING

CROSS-REFERENCE TO RELATED APPLICATION

This application claims the benefit of U.S. Provisional application Ser. No. 60/058,373, filed Sep. 9, 1997.

BACKGROUND OF THE INVENTION

1. Field of the Invention

This invention relates to synthetic resin coatings capable of dissipating surface electrostatic charge and more particularly to ultraviolet radiation-curable compositions for preparing coatings having high abrasion resistance in conjunction with permanent anti-static properties.

2. Brief Description of the Prior Art

Coatable compositions curable by ultraviolet radiation are well known in modern coating technology. Such coatings are convenient to apply and are environmentally advantageous because they typically contain no volatile organic solvents. However, such coatings, generally formed from synthetic resins, are often lacking in the hardness needed to prevent scratching of the surface in use, with accompanying dulling of the original glossy finish. Such scratching is especially undesirable when the coating is applied to a substrate that is intended to be transparent, e.g., glazing, cathode ray tube protective screens, enclosures for electronic instruments or the like. The accumulation of surface scratches on such articles causes the article to become hazy and decreases the optical transmission properties of the article. Such coatings also may have very high surface resistivity, which makes for very slow dissipation of static electric charge that may accumulate on the surface of the coated article. Hard, abrasion-resistant coatings have been prepared by polymerizing monomers having more than two polymerizable groups per monomer molecule to form highly cross-linked coated layers. However, such hard coatings are especially prone to have high surface resistivity.

Auxiliary anti-static coatings, sprayed onto the surface, have been used to alleviate the problem of retained static charge. However, such sprayed coatings are not permanent, but must be renewed from time to time. Accordingly, attempts have been made to provide permanent anti-static properties by increasing the intrinsic surface conductivity, i.e., decreasing the surface resistivity, by incorporating electrically conductive materials into the coatings. For example, U.S. Pat. No. 5,721,299, to Angelopoulos et al., discloses electrically conductive, scratch-resistant polymers incorporating conductive polymers. However, incorporation of other materials in significant amounts can tend to reduce the hardness of the coating and thereby its resistance to scratching.

Accordingly, a need has continued to exist for a hard, abrasion-resistant coating that has good static electricity dissipation properties, especially for use in coating transparent substrates.

SUMMARY OF THE INVENTION

The problem of providing an abrasion-resistant coating having permanent anti-static properties has now been alleviated by the ultraviolet-curable coating composition of the invention which comprises at least one addition polymerizable ethylenically unsaturated monomer,
a perfluoro ionic surfactant, and
a polyethoxy or fluorinated polyethoxy auxiliary compound.

The perfluoro ionic surfactant and the polyethoxy or fluorinated polyethoxy auxiliary compound are dispersible in the monomer and are present in the composition in amounts effective to impart static-dissipative properties to polymerized coatings prepared therefrom.

In another embodiment the invention is an ultraviolet-curable coating composition which comprises at least one addition polymerizable ethylenically unsaturated monomer, and
a lithium perfluoroalkylsulfonate salt, present in the composition in an amount effective to impart static-dissipative properties to polymerized coatings prepared therefrom.

The coating composition is particularly useful for coating transparent plastic substrates Accordingly, it is an object of the invention to provide a UV-curable acrylic coating composition.

A further object is to provide a UV-curable acrylic coating composition that has anti-static properties.

A further object is to provide a UV-curable acrylic coating composition that has good resistance to abrasion.

A further object is to provide a UV-curable coating composition that combines good abrasion resistance with good anti-static properties.

A further object is to provide a curable coating having good anti-static properties.

Further objects of the invention will become apparent from the description of the invention which follows.

DETAILED DESCRIPTION OF THE INVENTION AND PREFERRED EMBODIMENTS

The coating composition of the invention comprises a curable composition of polymerizable monomers. Preferably the composition comprises a UV-curable polyacrylate monomer or mixture of such monomers. The monomers may include acrylate and methacrylate (hereinafter referred to as (meth)acrylate) esters of $C_3$–$C_{12}$ aliphatic polyhydric alcohols having at least three hydroxyl groups in the molecule. Such UV-curable coating compositions are well-known in the art. They typically comprise a liquid monomer or mixture of monomers containing a substantial proportion of monomers having at least three acrylate moieties per molecule. For preparing hard, abrasion resistant, transparent coatings, the monomer mixture comprises more than 50% by weight of a (meth)acrylate ester having three or more acrylate moieties in the molecule. Such coatings are typically resistant to scratching when contacted and rubbed with abrasive materials such as steel wool or even abrasives. They can be used as transparent abrasion-resistant layers for covering transparent or translucent glazing, cathode ray tube screens, and the like. They can also be used as a top coating for surfaces coated or finished with softer polymers. Such hard, abrasion resistant layers, however, typically have very high surface resistivity. Accordingly, they readily accumulate static electrical charge and dissipate that charge very slowly. Consequently, they may attract dust or may even interfere with charge-sensitive electrical apparatus located nearby, e.g., within a housing coated with such an abrasion resistant coating.

Although the static electricity-dissipating coatings of the invention are not limited to hard, abrasion-resistant coatings, the invention is especially useful when applied to such coatings. According to the invention, such hard, abrasion-resistant coatings can be made static-dissipative (or static-resistant) by incorporating into the monomer mixture an effective amount of a fluorinated ionic surfactant together with an effective amount of a potentiating or auxiliary compound that is a polyethylene glycol or a fluorinated polyethylene glycol.

The basic polymerizable monomers used in forming the anti-static coatings of the invention may be any ethylenically unsaturated monomer capable of being polymerized to form a solid coating layer on a substrate. Preferred monomers are (meth)acrylate esters of $C_1$–$C_{12}$ mono- and polyhydric alcohols. For forming coatings having good hardness in addition to anti-static properties, preferred monomers include (meth) acrylate esters of $C_1$–$C_6$-alkyl mono(meth)acrylates, $C_1$–$C_6$-alkyl poly(meth)acrylates, $C_1$–$C_6$-alkyl tri(meth)acrylates, $C_1$–$C_6$-alkyl tetra(meth)acrylates, and dipentaerythritol polyacrylates. Particularly preferred monomers include pentaerythritol tetraacrylate (PETTA) and dipentaerythritol hexaacrylate (DIPEPA).

In order to provide anti-static properties to the cured coatings, the coating compositions of the invention incorporate a fluorinated ionic surfactant in an amount that, in combination with a polyethoxy or fluorinated polyethoxy auxiliary compound imparts a surface resistivity that is low enough to dissipate accumulated static electric charge within a reasonable period of time, e.g., a few minutes.

The perfluoro ionic surfactants useful in the compositions of the invention typically have a highly fluorinated alkyl chain with a terminal acidic or basic function that is in the salt form. Perfluoroalkyl carboxylic acid salts, perfluoroalkyl sulfonic acid salts, perfluoroalkyl phosphonic acid salts and perfluoroalkyl ammonium salts are exemplary functional perfluoro ionic surfactants. Preferred fluorinated ionic surfactants useful in the compositions of the invention are salts of perfluoroalkyl sulfonic acids of the formula

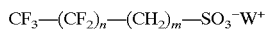

wherein n is the number of perfluoromethylene repeat units and M is the number of methylene spacers in the structure. Typically, n varies between 1 and 10 and m varies between 0 and 6. The cation $W^+$ can be derived from an alkali metal, e.g., potassium, lithium, etc., or may be ammonium. Suitable perfluoroalkyl sulfonate surfactants are commercially available as, e.g., FLUORAD FC-94®, FLUORAD FC-98®, and FLUORAD FC-99® from 3M Co./Industrial Chemical Products Div., St. Paul Minn.

The fluorinated ionic surfactant is present in the monomer composition in an amount sufficient, in combination with the secondary or potentiating ingredient, to reduce the surface resistivity below a value of about $2 \times 10^{13}$ ohms per square (ohms/sq, $\Omega$/sq). Values of surface resistivity above that value are generally not useful because surfaces exhibiting such high resistivities typically dissipate static charge too slowly.

Typical amounts of the fluorinated anionic surfactant incorporated into the coating composition of the invention will range from about 0.1% by weight to about 10% by weight, preferably from about 0.4% by weight to about 5.0% by weight and more preferably from about 0.5% by weight to about 2.5% by weight.

In another embodiment of the invention, when the perfluoroalkyl ionic surfactant is a lithium perfluoroalkylsulfonate, a satisfactory value of surface resistivity may be achieved with an amount of the lithium perfluoroalkylsulfonate alone, without the use of an auxiliary potentiating compound. Typically, for such compositions, a useful value of surface resistivity can be achieved by incorporating at least about 0.7% of the lithium perfluoroalkylsulfonate surfactant. Values of the lithium perfluoroalkylsulfonate surfactant up to at least about 15% by weight can be incorporated into the composition. The surface resistivity will be lower for the compositions containing more of the lithium perfluoroalkylsulfonate material, however if too much of the surfactant is incorporated, the abrasion resistance and adhesion may be adversely affected. The use of large proportions of the lithium perfluoroalkyl sulfonate alone is, in general, impractical, because the material is expensive, and equivalent results can be achieved using small amounts of the lithium salt together with an auxiliary compound of the invention.

The auxiliary or potentiating compound is a polyether, typically of the formula

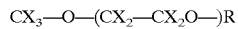

wherein X may be fluorine or hydrogen and R may be a lower alkyl group or hydrogen. Suitable materials for the auxiliary or potentiating compound include fluorinated surfactants such as fluorinated alkyl polyethoxy ethanols, fluorinated alkyl alkoxylates, and polyethylene glycols. Suitable fluorinated polyethoxy compounds are commercially available as, e.g., FLUORAD FC-170C® and FLUORAD FC-171® from 3M Co./Industrial Chemical Products Div., St. Paul Minn.

The amount of the potentiating compound incorporated in the composition of the invention will be an amount capable, in combination with the fluorinated alkyl surfactant, of reducing the surface resistivity of a cured coating prepared from the composition to a value no greater than about $2 \times 10^{13}$ ohms/sq. Typically, the amount of auxiliary compound will range from about 0.1% by weight to about 10% by weight, preferably from about 0.4% by weight to about 5.0% by weight and more preferably from about 0.5% by weight to about 2.5% by weight.

The amounts of the fluorinated surfactant and the auxiliary polyether may have to be adjusted according to the solubility of the materials in the polyacrylate monomer or monomers. The fluorinated surfactant and/or the polyether auxiliary compound must be soluble in the monomer or mixture of monomers, or at least dispersible therein to the extent that no substantial amount of light-scattering insoluble particles remains in the coating composition and the coating prepared therefrom.

Because fluorinated ionic surfactants are usually not very soluble in poly(meth)acrylate monomers, an effective amount of a polymerizable acrylate solubilizer may be added to the coating composition. The solubilizer should be soluble in the liquid monomer or monomer mixture and should enhance the solubility of the fluorinated anionic surfactant in the monomer to the extent that an effective concentration of the surfactant can be achieved in the monomer coating composition. Suitable solubilizers include lower aliphatic ethylenically unsaturated copolymerizable carboxylic acids having 3–6 carbon atoms. A preferred solubilizer is acrylic acid.

The solubilizer is present in the composition in an amount effective to increase the solubility or dispersibility of the fluorinated ionic surfactant in the monomer to the point that an effective amount of the surfactant can be incorporated into the composition. Typically, the solubilizer will be present in the composition in an amount of from about 1% by weight to about 50% by weight, preferably from about 5% by weight to about 35% by weight, and more preferably from about 10% by weight to about 30% by weight.

Although thermal polymerization, with or without suitable initiators, is not excluded as a method of preparing the polymerized anti-static coatings of the invention, it is preferred to prepare the compositions from unsaturated monomers that undergo addition polymerization initiated by exposure to actinic radiation. After the composition is coated onto a surface, the coating is cured by exposure to actinic radiation, typically ultraviolet (UV) radiation. Although ultraviolet radiation alone can initiate polymerization of such coatings, only the shorter wavelengths are efficiently absorbed by the monomers. Accordingly, it is conventional to include in the mixture a photosensitizing compound that absorbs the longer wavelength ultraviolet radiation and initiates polymerization by transferring the excitation to the unsaturated moieties. Such photosensitizers are well known to those skilled in the art and include aromatic ketones such as benzophenone, substituted benzophenones, substituted acetophenones, Michler's ketone and the like. A preferred photoinitiator is 2-hydroxy-2-methyl-1-phenyl propanone (HMPP). The photoinitiator may be present in the polymerizable composition in an amount from about 0.1% by weight to about 10% by weight.

The compositions of the invention provide permanent anti-static abrasion-resistant coatings. When cured under high intensity ultraviolet light, the coating exhibits surface resistivity values between about $5 \times 10^9$ ohms/square and about $5 \times 10^{13}$ ohms/square (ASTM D257). Coatings having a surface resistivity greater than about $5 \times 10^{13}$ ohms/square are generally not useful as static-dissipative coatings.

The coatings of the invention exhibit little increase in haze when tested by standard tests using a Taber abraser. As prepared, the coatings are essentially optically transparent, that is, the percent haze value for the coated substrate is not measurably greater than that for the uncoated substrate. The increase in percent haze after abrasion under specified conditions with the Taber abraser is typically less than about 2.5% to 5.0% (Taber abraser, 100 cycles CS 10F wheels @ 500 g load). The percent haze in this test is defined as {(direct light transmission—diffuse light transmission)/direct light transmission}×100%.

The coating composition of the invention may be applied to a substrate by any conventional coating method. Typically, the coating composition is applied to a transparent substrate, e.g., of poly(methylmethacrylate), by coating with a wirewound rod, by flow coating, roll coating or the like. It will be understood by the skilled practitioner that the viscosity of the coating composition may have to be adjusted, e.g., by dilution with a suitable solvent, to provide a viscosity suitable for a given coating method. The coating thickness may vary depending on the application. Typically the composition is coated at a thickness ranging from about 5 μm to about 40μ, preferably from about 10μ to about 15 μm. The coated composition is then cured by exposure to UV light, e.g., from a medium-pressure mercury arc lamp, xenon arc lamp, or the light. Typically an intensity of about 200 w/in² provides a conveniently rapid cure, i.e., in a period of a few seconds.

The invention will be illustrated by the following examples, which are intended to be illustrative and not limiting.

EXAMPLES 1–7

These examples illustrate the preparation of control compositions containing no fluorinated surfactant component or potentiating compound.

Glacial acrylic acid (HOAcr, 10.00 g) was added to a stirred vessel containing 90.00 g of pentaerythritol tetraacrylate (PETTA) and 3.5 g of 2-hydroxy-2-methyl-1-phenylpropanone (HMPP). Accordingly, the fundamental polymerizable mixture contained 90% by weight of PETTA and 10% by weight of HOAcr. The photoinitiator, HMPP, was incorporated to the amount of 3.5% by weight of the fundamental mixture. After the mixture was thoroughly stirred, a thin film (12 μm in thickness) was applied to the surface of a transparent poly(methylmethacrylate) sheet, using a wire-wound rod coater, and cured by irradiation with high intensity ultraviolet (UV) light from a medium pressure mercury arc lamp (200 watts per square inch).

The resulting coating was then tested for adhesion by ASTM Method D3359 Method B. In this procedure, a selected square area of the surface is scored into 100 1 mm×1 mm squares. A pressure sensitive tape is applied to the scored area and pulled off. When all of the small squares remain adhered to the surface, the adhesion is scored as 5A, and is so indicated in the "ADH" column of Table 1. The adhesion of the control coatings to the PMMA substrate was found to be excellent.

Abrasion resistance was measured using a Taber abraser according to the procedure of ASTM Method D1044-94. In this procedure, the haze exhibited by the coated material before abrasion is measured by a photometric measurement of light scattered from a beam of light passing through the sample. The haze value of the substrate typically ranges from about 1.4% to about 1.7%, and the haze value of the coated substrate before abrasion is not significantly different. After abrasion with the Taber abraser, the haze is again measured and the increase in haze is taken as a measure of the abrasion resistance of the cured coating. Smaller values of increase of the haze indicate a harder and generally more useful coating. Typically the control coatings exhibit increases in haze after abrasion of less than 5%, typically ranging from about 2.5% to about 4.5%

The surface resistivity was measured by ASTM Method D257. The test results are listed in Table 1 below for Example 1. The adhesion test demonstrated that the coating had excellent adhesion, as indicated by the reported result, 5A. The abrasion resistance was satisfactory as measured by the very slight increase in haze produced by the abrasion. The surface resistivity exceeded $2.2 \times 10^{14}$ ohms/square, the maximum value measurable on the instrument available. Accordingly the surface resistivity is listed in Table 1 as "++" indicating a value too high to measure and too high to provide static dissipation. Such a high value indicates severe static retention and a very long time for a static charge to dissipate naturally, typically several hours. Evidently such a high surface resistivity is not useful for articles such as plastic glazing where a static charge leads to accumulation of dust.

A series of coating compositions, Examples 2–7, were prepared by the procedure of Example 1 having different proportions of PETTA and acrylic acid. Each composition contained 3.5% by weight of the photoinitiator HMPP. The compositions were coated on PMMA substrates, cured and the properties tested by the procedures of Example 1. The properties of the cured coatings are reported in Table 1. It may be seen that all the control coatings had satisfactory adhesion, and all were sufficiently resistant to abrasion. However, all the control coatings had values of surface resistivity that were too high for effective dissipation of static charge.

EXAMPLES 8–13

These examples illustrate the preparation of compositions containing either the perfluorsulfonate surfactant or the potentiating compound.

In order to prepare compositions containing a perfluoroalkyl sulfonate surfactant, a solid commercially available potassium perfluoroalkyl sulfonate (FLUORAD® FC-98, 3M Co./Industrial Chemical Products Div., St. Paul Minn.) is first dissolved in glacial acetic acid by adding the glacial acetic acid to a vessel containing the solid salt with vigorous stirring. The solution of potassium perfluoroalkyl sulfonate is then added to a stirred solution of HMPP in pentaerythritol tetraacrylate.

Compositions containing only the potentiating compound were prepared by combining glacial acrylic acid, pentaerythritol tetraacrylate, the potentiating polyether compound and the HMPP photoinitiator with stirring.

In preparing the three control compositions, the amounts of the ingredients are chosen to provide a polymerizable composition in which the proportions of the mixture, excluding the photoinitiator, are as given in Table 1, Examples 8–10. Each composition also contained an additional 3.5% of HMPP, based on the weight of coating composition excluding the HMPP.

The samples were then coated onto a PMMA substrate at a thickness of 12 $\mu$m with a wire-wound rod, cured by exposure to UV light and tested for adhesion, abrasion resistance and surface resistivity by the procedures of Example 1. The adhesion of the coating to the substrate was excellent, and the abrasion resistance was satisfactory. However the surface resistivity was too great to provide useful dissipation of static charge.

EXAMPLES 14–20

These examples illustrate the abrasion-resistant, static-dissipating coating composition of the invention.

A series of compositions according to the invention were prepared by dissolving potassium perfluoroalkyl sulfonate in glacial acetic acid and adding the solution to a mixture of pentaerythritol tetraacrylate, a potentiating polyether compound and the HMPP photoinitiator. The amounts of the ingredients were selected to provide a composition in which the proportion of ingredients, excluding the photoinitiator, are as given in Table 1. Each composition contained an additional 3.5% by weight of the photoinitiator, calculated on the weight of the composition excluding the photoinitiator.

The compositions were then coated on PMMA test substrates at a thickness of 12 $\mu$m, cured by exposure to UV light and tested for adhesion, abrasion resistance and surface resistivity as in Example 1. The results are summarized in Table 1. The adhesion of the coating was excellent and the abrasion resistance, as measured by the increased haze produced by abrasion, was small and satisfactory. The surface resistivity varied between about $5 \times 10^9$ ohms/sq and about $5 \times 10^{13}$ ohms/sq. It has been found that values of surface resistivity no greater than about $5 \times 10^{13}$ ohms/sq produce a satisfactory rate of dissipation of static charge. Consequently, the test compositions of Examples 14–20 show satisfactory properties for use as an anti-static and anti-abrasion coating for transparent substrates.

The test results establish that the anti-static property at the low levels of anti-static ingredients is due to the combination of the fluorinated ionic surfactant, e.g., FLUORAD FC-94®, with any of the auxiliary polyethoxy compounds. The fluorinated ionic surfactant alone, or the auxiliary compound alone is not effective. However, the synergistic combination of the fluorinated ionic surfactant and the auxiliary polyethoxy compound results in a coating having effective anti-static properties at low levels of the active ingredients.

TABLE 1

| Ex. | Wt. % PETTA | Wt. % HOAcr | Wt. % FC-98 ® | Wt. % PEG | Wt. % FC-171 ® | Wt.% FC-170C ® | SR ($\Omega$/sq) | AR | ADH |
|---|---|---|---|---|---|---|---|---|---|
| 1 | 90.00 | 10.00 | 0 | 0 | 0 | 0 | ++ | + | 5A |
| 2 | 85.00 | 15.00 | 0 | 0 | 0 | 0 | ++ | + | 5A |
| 3 | 80.00 | 20.00 | 0 | 0 | 0 | 0 | ++ | + | 5A |
| 4 | 75.00 | 25.00 | 0 | 0 | 0 | 0 | ++ | + | 5A |
| 5 | 70.00 | 30.00 | 0 | 0 | 0 | 0 | ++ | + | 5A |
| 6 | 65.00 | 35.00 | 0 | 0 | 0 | 0 | ++ | + | 5A |
| 7 | 50.00 | 50.00 | 0 | 0 | 0 | 0 | ++ | + | 5A |
| 8 | 73.50 | 25.00 | 1.50 | 0 | 0 | 0 | ++ | + | 5A |
| 9 | 73.20 | 25.00 | 1.80 | 0 | 0 | 0 | ++ | + | 5A |
| 10 | 90.00 | 9.10 | 0.90 | 0 | 0 | 0 | ++ | + | 5A |
| 11 | 75.00 | 24.50 | 0 | 0 | 0.50 | 0 | ++ | + | 5A |
| 12 | 75.00 | 24.05 | 0 | 0 | 0 | 0.50 | ++ | + | SA |
| 13 | 75.00 | 24.50 | 0 | 0.50 | 0 | 0 | ++ | + | 5A |
| 14 | 83.00 | 15.50 | 1.53 | 0 | 0 | 0.10 | S | + | 5A |
| 15 | 84.00 | 15.10 | 0.90 | 0 | 0 | 0.40 | S | + | 5A |
| 16 | 84.50 | 14.00 | 0.90 | 0 | 0 | 0.50 | S | + | 5A |
| 17 | 83.00 | 15.00 | 0.90 | 1.00 | 0 | 0 | S | + | 5A |
| 18 | 83.00 | 15.26 | 0.805 | 0 | 1.05 | 0 | S | + | 5A |
| 19 | 75.02 | 24.06 | 0.926 | 0 | 0.51 | 0 | S | + | 5A |
| 20 | 78.23 | 17.03 | 0.891 | 0 | 0.10 | 0 | S | + | 5A |

SR = Surface Resistivity
AR = Abrasion Resistance
ADH = Adhesion
++ = Value > $2.2 \times 10^{14}$ $\Omega$/sq, static dissipation unsatisfactory
S = value < $5 \times 10^{13}$ $\Omega$/sq, static dissipation satisfactory
+ = Satisfactory abrasion resistance

EXAMPLE 21–31

These examples illustrate compositions of the invention using a lithium perfluoroalkyl salt as the anti-static fluorinated surfactant.

A stock solution was prepared containing 74.90 g of PETTA, 25.10 g of glacial acrylic acid and 3.58 g of HMPP. To a 10.00 g aliquot of the stock solution were added 0.10 g of a lithium perfluoroalkyl sulfonate surfactant (FLUORAD® FC-94, 3M Co./Industrial Chemical Products Div., St. Paul Minn.), and 0.05 g of a fluorinated polyether potentiating compound. A transparent PMMA panel was coated with this composition, cured by exposure to UV light, and tested by the procedure of Example 1. The results are given in Table 2 below. Abrasion resistance and adhesion were excellent and the surface resistivity was satisfactory. Example 29 shows that a composition containing the lithium perfluoroalkyl sulfonate alone, in a proportion of 1 part per 100 parts of the composition, had a surface resistivity that was higher than compositions incorporating an auxiliary compound, but still low enough to provide useful static dissipation. Examples 30 and 31 show compositions with greater amounts of the lithium salt, without auxiliary compound, give satisfactory values of surface resistivity, with acceptable abrasion resistance (measured by rubbing with 0000 grade steel wool) and adhesion. However, compositions containing such high loadings of the lithium salt tend to be too expensive for commercial application. Examples 32 and 33 show that coatings devoid of the lithium perfluoroalkyl sulfonate surfactant have a surface resistivity that is unsatisfactory.

Glacial acrylic acid, 95.10 parts by weight, is added to 4.90 parts by weight of a lithium perfluoroalkyl sulfonate salt. When the salt is completely dissolved, an 18.00 parts aliquot of the solution is added to 78.00 parts by weight of PETTA, followed by 3.5 parts by weight of HMPP and 0.10 parts by weight of a fluorinated alkyl alkoxylate (FLUORAD FC-171®). after coating onto a PMMA panel and curing by irradiation with UV light, the coating so prepared exhibits excellent adhesion, high abrasion resistance, and a surface resistivity satisfactory for dissipating static electricity.

EXAMPLE 36

This example illustrates a preferred composition of the invention using dipentaerythritol hexaacrylate as the monomer.

Glacial acrylic acid, 95.10 parts by weight, is added to 4.90 parts by weight of a lithium perfluoroalkyl sulfonate salt (FLUORAD® FC-94). When the salt is completely dissolved, an 18.00 parts aliquot of the solution is added to 78.00 parts by weight of PETTA, followed by 3.5 parts by weight of HMPP and 0.10 parts by weight of a fluorinated

TABLE 2

| Ex. | Parts PETTA | Parts HOAcr | Parts LPFAS | Parts PEG | Parts FC-171 | Parts FC-170C | SR ($\Omega$/sq.) | AR | ADH ($\times$ 100) |
|---|---|---|---|---|---|---|---|---|---|
| 21 | 74.90 | 25.10 | 1.0 | 0 | 0 | 0.5 | $8.7 \times 10^{11}$ | + | 5A |
| 22 | 74.90 | 25.10 | 0.5 | 0 | 0.4 | 0 | $2.8 \times 10^{11}$ | + | 5A |
| 23 | 74.90 | 25.10 | 1.0 | 0 | 0.4 | 0 | $1.8 \times 10^{11}$ | + | 5A |
| 24 | 74.90 | 25.10 | 1.5 | 0 | 0.5 | 0 | $1.8 \times 10^{11}$ | + | 5A |
| 25 | 74.90 | 25.10 | 0.5 | 0 | 0 | 0.4 | $3.1 \times 10^{11}$ | + | 5A |
| 26 | 74.90 | 25.10 | 1.5 | 0 | 0 | 0.5 | $1.5 \times 10^{11}$ | + | 5A |
| 27 | 74.90 | 25.10 | 0.5 | 0.5 | 0 | 0 | $5.9 \times 10^{11}$ | + | 5A |
| 28 | 74.90 | 25.10 | 1.0 | 0.8 | 0 | 0 | $4.2 \times 10^{10}$ | + | 5A |
| 29 | 74.90 | 25.10 | 1.0 | 0 | 0 | 0 | $4.2 \times 10^{12}$ | + | 5A |
| 30 | 85.00 | 15.00 | 5.0 | 0 | 0 | 0 | $7.5 \times 10^{10}$ | + | 5A |
| 31 | 85.00 | 15.00 | 10.0 | 0 | 0 | 0 | $8.5 \times 10^{9}$ | + | 5A |
| 32 | 74.90 | 25.10 | 0 | 0 | 0 | 0.7 | ++ | + | 5A |
| 33 | 75.00 | 24.50 | 0 | 0 | 0.5 | 0 | ++ | + | 5A |

++ = value > $2.2 \times 10^{14}$ $\Omega$/sq, static dissipation unsatisfactory.

EXAMPLE 34

This example illustrates a composition of the invention using an ammonium perfluoroalkyl salt as the anti-static fluorinated surfactant.

Glacial acrylic acid (20.00 g) was added to 3.5 g of the solid ammonium perfluoroalkyl sulfonate (FLUORAD FC-99®, 3M Co./Industrial Chemical Products Div., St. Paul Minn.) and stirred until the salt was completely dissolved. A 2.63 g aliquot of this mixture was then added to 20.4 g of PETTA, 1.05 g of HMPP and 0.10 g of a fluorinated polyether potentiating compound (FC-171®). A transparent PMMA panel was coated with this composition, cured by exposure to UV light, and tested by the procedure of Example 1. The adhesion of the coated film was excellent (5A by ASTM D3359 Method B). Although the cured film was slightly hazy, the anti-static property was good (surface resistivity, $4.6 \times 10^{12}$ $\Omega$/sq). A control sample devoid of the FC-171® polyether auxiliary compound was unsatisfactory (surface resistivity, >$2.2 \times 10^{14}$) $\Omega$/sq).

EXAMPLE 35

This example illustrates a preferred composition of the invention using a potassium perfluoroalkyl salt as the anti-static fluorinated surfactant.

alkyl alkoxylate (Fluorad FC-171®). after coating onto a PMMA panel and curing by irradiation with UV light, the coating so prepared exhibits excellent adhesion, high abrasion resistance, and a surface resistivity satisfactory for dissipating static electricity.

EXAMPLE 37

Glacial acrylic acid (24.06 g) was added to 0.926 g of a potassium perfluoroalkyl sulfonic acid salt (FC-98). This solution was added to a stirred vessel containing 75.02 g pentaerythritol tetraacrylate, 0.506 g of a fluorinated alkyl alkoxylate (FC-171), and 3.54 g of 2-hydroxy-2-methyl-1-phenylpropanone.

The composition was coated with a wire-wound rod onto PMMA panels at a wet film thickness of approximately 12.5 microns and exposed to high intensity ultraviolet radiation to effect cure. The cured coating exhibited satisfactory properties of abrasion resistance and static dissipation.

A second sample was reduced to 25 wt % solids by dilution with isopropyl alcohol. This second composition was flowed down over a vertically oriented 8-inch×11-inch PMMA panel (long dimension vertical) followed by exposure to high intensity ultraviolet radiation for cure. This process results in a variable coating thickness from the top to the bottom of the panel. Typically, the thickness of the coating so prepared varies from about 5 micrometers at the top to about 10 micrometers at the bottom.

The adhesion and abrasion resistance of the cured film was again excellent. The abrasion resistance of the flow coated samples was measured at various randomly selected locations on the panel by percent increase in haze of the area abraded by Taber abrasion method (100 cycles CS-10F wheels @ 500 g load). The results at the statistically sampled locations are tabulated in Table 3. Surface resistivity values were between $5.0 \times 10^{11}$ and $5.0 \times 10^{12}$ ohms/square as compared to control samples which were $>2.2 \times 10^{14}$ ohms/square.

TABLE 3

ABRASION RESISTANCE AND SURFACE RESISTIVITY OF FLOW COATED SAMPLES

| Sample | % H$_0$ | % H$_1$ | Δ H | SR (ohms per square) |
|---|---|---|---|---|
| Uncoated PMMA | 1.70 | — | — | $>2.2 \times 10^{14}$ |
| 1 | 1.46 | 3.96 | 2.50 | $6.0 \times 10^{12}$ |
| 2 | 1.46 | 5.99 | 4.53 | $6.0 \times 10^{12}$ |
| 3 | 1.46 | 5.49 | 4.03 | $6.0 \times 10^{12}$ |
| 4 | 1.46 | 5.37 | 3.91 | $6.0 \times 10^{12}$ |

% H$_0$ = Initial percent haze in sheet
% H$_1$ = Percent haze after 100 cycles with CS 10F wheel @ 500 g load
Δ H = Change in percent haze The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

We claim:

1. A curable coating composition for preparing an antistatic coating, said composition comprising
   at least one addition polymerizable ethylenically unsaturated monomer,
   a perfluoro ionic surfactant, and
   a polyethoxy or fluorinated polyethoxy auxiliary compound,
   said perfluoro ionic surfactant and said polyethoxy or fluorinated polyethoxy auxiliary compound being dispersible in said monomer and being present in said composition in amounts effective to impart static-dissipative properties to polymerized coatings prepared therefrom.

2. The composition of claim 1 wherein said ethylenically unsaturated monomer is a (meth)acrylic ester.

3. The composition of claim 2 wherein said acrylic ester is selected from the group consisting of (meth)acrylate esters of mono- and polyhydric aliphatic alcohols having 1–12 carbon atoms.

4. The composition of claim 2 wherein said acrylic ester is selected from the group consisting of poly C1–C6-alkyl mono(meth)acrylates, C1–C6-alkyl poly(meth)acrylates, C1–C6-alkyl tri(meth)acrylates, C1–C6-alkyl tetra(meth)acrylates, and dipentaerythritol polyacrylates.

5. The composition of claim 2 wherein said acrylic ester is pentaerythritol tetraacrylate.

6. The composition of claim 2 wherein said acrylic ester is dipentaerythritol hexaacrylate.

7. The composition of claim 1 wherein said perfluoro ionic surfactant is a perfluoroalkyl sulfonate surfactant.

8. The composition of claim 7 wherein said perfluoro ionic surfactant is selected from the group consisting of alkali metal perfluoroalkyl sulfonate surfactants and ammonium perfluoroalkyl sulfonate surfactant.

9. The composition of claim 1 wherein said polyethoxy or fluorinated polyethoxy auxiliary compound is selected from the group consisting of polyethylene glycols, fluorinated alkyl polyethoxy ethanol, and fluorinated alkyl alkoxylates.

10. The composition of claim 1 additionally comprising an amount of a photoinitiator compound effective to initiate polymerization of said composition under exposure to ultraviolet light.

11. The composition of claim 10 wherein said photoinitiator compound is 2-hydroxy-2-methyl-1-phenylpropanone.

12. The composition of claim 10 wherein said photoinitiator compound is present in an amount of from about 0.5% by weight to about 5.0% by weight.

13. The composition of claim 10 wherein said photoinitiator compound is present in an amount of from about 2.0% by weight to about 4.0% by weight.

14. The composition of claim 1 additionally comprising an amount of a polymerizable carboxylic acid monomer effective to solubilize said perfluoro ionic surfactant in said liquid monomer.

15. The composition of claim 14 wherein said polymerizable carboxylic acid monomer is (meth)acrylic acid.

16. The composition of claim 1 wherein said addition polymerizable ethylenically unsaturated monomer is present in an amount of from about 75% by weight to about 99.5% by weight.

17. The composition of claim 1 wherein said addition polymerizable ethylenically unsaturated monomer is present in an amount of from about 85% by weight to about 99.5% by weight.

18. The composition of claim 1 wherein said addition polymerizable ethylenically unsaturated monomer is present in an amount of from about 90% by weight to about 99.5% by weight.

19. The composition of claim 1 wherein said fluorinated organic anionic surfactant is present in an amount of from about 0.05% by weight to about 15% by weight.

20. The composition of claim 1 wherein said fluorinated organic anionic surfactant is present in an amount of from about 0.1 by weight to about 3% by weight.

21. The composition of claim 1 wherein said fluorinated organic anionic surfactant is present in an amount of from about 0.4% by weight to about 2.0% by weight.

22. The composition of claim 1 wherein said polyethoxy or fluorinated polyethoxy auxiliary compound is present in an amount of from about 0.05% by weight to about 10% by weight.

23. The composition of claim 1 wherein said polyethoxy or fluorinated polyethoxy auxiliary compound is present in an amount of from about 0.1% by weight to about 5% by weight.

24. The composition of claim 1 wherein said polyethoxy or fluorinated polyethoxy auxiliary compound is present in an amount of from about 0.1% by weight to about 2% by weight.

25. An static electricity-dissipating coating comprising a cured composition consisting essentially of
   a solid polymer of at least one addition polymerizable ethylenically unsaturated monomer coated on a substrate, a perfluoro ionic surfactant, and a polyethoxy or fluorinated polyethoxy auxiliary compound, said perfluoro ionic surfactant and said polyethoxy or fluorinated polyethoxy auxiliary compound being dispersible in said monomer and being present in said composition in amounts effective to impart static-dissipative properties to said polymer layer.

26. A method of imparting static electricity-dissipating properties to an organic coating on a substrate comprising 1.) incorporating into a curable organic coating composition a combination of a perfluoro ionic surfactant, and a polyethoxy or fluorinated polyethoxy auxiliary compound, said perfluoro ionic surfactant and said polyethoxy or fluorinated polyethoxy auxiliary compound being dispersed in said coating composition and being present in said coating composition in amounts effective to impart static-dissipative properties to cured coatings prepared therefrom, 2.) coating said coating composition onto a substrate, and 3.) curing said deposited coating composition to form a solid coating layer on said substrate.

27. A curable coating composition for preparing an anti-static coating, said composition consisting essentially of at least one addition polymerizable ethylenically unsaturated monomer, and a lithium perfluoroalkylsulfonate surfactant, and said lithium perfluoroalkylsulfonate salt being dispersible in said monomer and being present in said composition in amounts effective to impart static-dissipative properties to polymerized coatings prepared therefrom.

28. The curable composition of claim 27 wherein said lithium perfluoroalkylsulfonate salt is present in an amount of from about 0.8% by weight to about 15% by weight.

29. The curable composition of claim 27 wherein said lithium perfluoroalkylsulfonate salt is present in an amount of from about 0.8% by weight to about 5% by weight.

* * * * *